United States Patent [19]
Brezinski

[11] Patent Number: 5,916,484
[45] Date of Patent: Jun. 29, 1999

[54] METAL CORROSION INHIBITED ORGANIC ACID COMPOSITIONS

[75] Inventor: Michael M. Brezinski, Hague, Netherlands

[73] Assignee: Halliburton Energy Services, Inc., Duncan, Okla.

[21] Appl. No.: 08/855,622

[22] Filed: May 13, 1997

[51] Int. Cl.$^6$ ...................................................... C09K 3/00
[52] U.S. Cl. .......................... 252/391; 252/394; 252/395; 507/244; 507/256; 507/934; 507/939; 422/12
[58] Field of Search ................................ 422/12; 252/391, 252/394, 395; 507/934, 939, 244, 256

[56] References Cited

U.S. PATENT DOCUMENTS

| | | |
|---|---|---|
| 2,758,970 | 8/1956 | Sankaitis et al. ........................ 252/8.55 |
| 3,932,296 | 1/1976 | Byth .......................................... 252/148 |
| 4,498,997 | 2/1985 | Walker ................................ 252/8.55 C |
| 4,552,672 | 11/1985 | Walker ................................ 252/8.55 C |
| 4,670,186 | 6/1987 | Quinlan .................................... 252/392 |
| 4,684,507 | 8/1987 | Thompson et al. ........................ 422/12 |
| 4,762,627 | 8/1988 | Martinez et al. .................... 252/8.555 |
| 5,366,643 | 11/1994 | Walker ................................ 252/8.555 |
| 5,441,929 | 8/1995 | Walker .................................... 507/260 |

*Primary Examiner*—Philip Tucker
*Attorney, Agent, or Firm*—Robert A. Kent; Clark Dougherty, Jr.

[57] ABSTRACT

By the present invention, improved metal corrosion inhibited aqueous organic acid compositions and methods are provided. The compositions are basically comprised of water, an organic acid, a corrosion inhibitor comprising at least one rosin amine derivative and a low toxicity corrosion inhibitor intensifier selected from the group consisting of thioglycolic acid and derivatives thereof.

30 Claims, No Drawings

METAL CORROSION INHIBITED ORGANIC ACID COMPOSITIONS

BACKGROUND OF THE INVENTION

1. Field of the Invention

The present invention relates to improved metal corrosion inhibited organic acid compositions and methods of using the compositions.

2. Description of the Prior Art

Subterranean hydrocarbon containing formations penetrated by well bores are often treated with aqueous acid compositions to stimulate the production of hydrocarbons therefrom. One such treatment known as "acidizing" involves the introduction of an aqueous acid composition into a subterranean formation under pressure so that the acid composition flows through the pore spaces of the formation. The acid composition reacts with acid soluble materials contained in the formation thereby increasing the size of the pore spaces and the permeability of the formation. Another production stimulation treatment known as "fracture-acidizing" involves the formation of one or more fractures in the formation and the introduction of an aqueous acid composition into the fractures to etch the fracture faces whereby flow channels are formed when the fractures close. The aqueous acid composition also enlarges the pore spaces in the fracture faces and in the formation.

While acidizing and fracture-acidizing well stimulation treatments have been performed successfully over the years, a continuous problem which accompanies the treatments is the corrosion of metal pumps, tubular goods and other equipment used to introduce the aqueous acid compositions into the subterranean formation to be treated. The expense associated with repairing or replacing corrosion damaged tubular goods and equipment can be very high. The corrosion rate of metal equipment and tubular goods is increased by elevated temperatures encountered in deep formations, and the corrosion results in at least the partial neutralization of the aqueous acid compositions before they react with acid-soluble materials in the formations.

Aqueous acid compositions are also utilized in a variety of other industrial applications to contact and react with acid soluble materials. In such applications, metal equipment and metal surfaces are necessarily also contacted with the acid compositions, and the resulting corrosion of such metal equipment and surfaces is highly undesirable.

A variety of metal corrosion inhibited aqueous organic acid compositions for carrying out acidizing and fracture-acidizing stimulation treatments in wells and for performing other acidizing operations have been developed heretofore. For example, the rosin amine derivatives described in U.S. Pat. No. 2,758,970 issued to Sankaitis et al. on Aug. 14, 1956 have been extensively utilized along with other metal corrosion inhibitor components in aqueous organic acid compositions. Such metal corrosion inhibitor formulations have commonly also included large concentrations of thiourea and/or thiourea derivatives which function to intensify the metal corrosion protection afforded by the formulations. However, a disadvantage of the corrosion inhibitor formulations and the aqueous organic acid compositions containing the formulations is that thiourea and its derivatives are highly toxic, i.e., they are considered to be carcinogens and cause damage to living tissue when ingested, inhaled, or absorbed on the skin.

Thus, there is a need for improved metal corrosion inhibited aqueous organic acid compositions which are of low toxicity but still function effectively to minimize metal corrosion.

SUMMARY OF THE INVENTION

The present invention provides effective metal corrosion inhibited organic acid compositions and methods of using such compositions for carrying out acidizing operations including well acidizing treatments which meet the needs described above and overcome the deficiencies of the prior art.

The metal corrosion inhibited organic acid compositions of this invention include corrosion inhibitor components utilized heretofore plus one or more low toxicity corrosion inhibitor intensifiers. That is, the metal corrosion inhibited organic acid compositions of this invention are basically comprised of water, an organic acid, a corrosion inhibitor comprising at least one rosin amine derivative and a low toxicity corrosion inhibitor intensifier selected from the group consisting of thioglycolic acid and derivatives thereof.

The methods of this invention whereby acid soluble materials are contacted and reacted with an aqueous organic acid composition, but the corrosive effects of the aqueous organic acid composition on metal surfaces also contacted by the acid composition are minimized, are basically comprised of the following steps. A corrosion inhibitor including at least one rosin amine derivative and a corrosion inhibitor intensifier selected from the group consisting of thioglycolic acid and derivatives thereof are combined with an aqueous organic acid solution. Thereafter, acid soluble materials and metal surfaces are contacted with the resulting corrosion inhibited acid solution.

It is, therefore, a general object of the present invention to provide improved corrosion inhibited organic acid compositions and methods.

Other and further objects, features and advantages of the present invention will be readily apparent to those skilled in the art upon a reading of the description of preferred embodiments which follows.

DESCRIPTION OF PREFERRED EMBODIMENTS

The present invention provides improved metal corrosion inhibited organic acid compositions and methods of using the compositions. The improved corrosion inhibited organic acid compositions are basically comprised of an aqueous organic acid solution, at least one rosin amine derivative and a low toxicity corrosion inhibitor intensifier selected from the group consisting of thioglycolic acid and derivatives thereof.

The water utilized to form the aqueous organic acid solution and composition of this invention can be any aqueous fluid which does not adversely react with other components of the composition. For example, the water can be fresh water, brackish water, brine, salt-containing water solutions such as sodium chloride, potassium chloride or ammonium chloride solutions and the like.

The organic acid employed in the compositions is selected from the group consisting of formic acid, acetic acid, glycolic acid, citric acid and mixtures of such acids. Preferably, an aqueous acid solution is formed having an organic acid concentration in the range of from about 1% to about 30% by weight of water in the solution, and more preferably from about 1% to about 25%.

The corrosion inhibitor utilized in the aqueous organic acid compositions of this invention is comprised of at least one rosin amine derivative having the formula

wherein R is selected from the group consisting of abietyl, hydroabietyl and dihydroabietyl radicals, $R_1$ is the radical $CH_2R_3$, $R_2$ is selected from the group consisting of hydrogen and the radical $CH_2R_3$ and $R_3$ is an alpha ketonyl radical.

Examples of ketones from which the alpha ketonyl radical can be derived include acetone, methyl ethyl ketone, diacetone alcohol, 2,4-pentane dionyl, acetonylacetone, isophorone, mesityl oxide, cyclopentanone, cyclohexanone and acetophenone.

As described in more detail in U.S. Pat. No. 2,758,970 issued to Sankaitis et al. on Aug. 14, 1956, the above described rosin amine derivatives can be prepared in accordance with the following procedure. One mole of rosin amine is reacted with 1 to 4 moles of an appropriate ketone plus 1 to 4 moles of formaldehyde. Generally, the rosin amine is dissolved in the ketone after which from 1 to 4 moles of 37% aqueous formaldehyde solution is added with stirring. One mole of concentrated hydrochloric acid is added with stirring under ref reflux conditions. The mixture is allowed to reflux for a period varying between 1 and 24 hours. At the end of the reflux period, if a volatile ketone has been used any excess ketone is distilled off. The reaction mixture contains rosin amine derivatives in the form of their hydrochlorides and those compounds can be used as metal corrosion inhibiting materials without further purification or modification. The rosin amine derivatives are soluble in water or other appropriate solvents.

The corrosion inhibitor can also include one or more solvents and/or surfactants. Suitable solvents include alkyl alcohols such as methyl alcohol, ethyl alcohol, propyl alcohol, isopropyl alcohol, butyl alcohol and the like and alkylene glycols such as ethylene glycol, propylene glycol and the like.

One or more surfactants can be utilized to facilitate the dispersion of the corrosion inhibitor components in the aqueous organic acid solution. Non-ionic surfactants are preferred such as the 8 to 20 mole ethylene oxide adducts of octylphenol, nonylphenol, tridecylphenol and the like. When used, the surfactant or surfactants preferably comprises less than about 20% by volume of the corrosion inhibitor.

The corrosion inhibitor is generally added to the aqueous organic acid solution in an amount in the range of from about 0.05% to about 3% by volume of the acid solution, more preferably from about 0.1% to about 2%.

As mentioned above, the metal corrosion inhibited organic acid compositions utilized heretofore have included rosin amine derivatives and other components as well as relatively high concentrations of thiourea and/or thiourea derivative corrosion inhibitor intensifiers. Thiourea and its derivatives are very highly toxic, are considered to be carcinogens and are generally injurious when ingested, inhaled or absorbed by the skin. Thus, special handling and disposal procedures must be utilized when those corrosion inhibited aqueous organic acid compositions are prepared, used and disposed of.

By the present invention, metal corrosion inhibited aqueous organic acid compositions which include low toxicity corrosion inhibitor intensifiers are provided. The present invention is based on the discovery that low toxicity thioglycolic acid and its derivatives function as organic acid corrosion inhibitor intensifiers and are equal to or better than the highly toxic thiourea and derivative intensifiers used heretofore.

The preferred corrosion inhibitor intensifiers for use in accordance with the present invention are thioglycolic acid, and/or one or more of its derivatives such as thiolactic acid and thiomalic acid. Of the various intensifiers that can be used, thioglycolic acid is the most preferred.

The intensifier of this invention is present in an aqueous organic acid composition of the invention in an amount in the range of from about 0.01% to about 1% by volume of the acid solution in the composition. More preferably, the intensifier is present in an amount in the range of from about 0.05% to about 1% by volume of the acid solution.

In accordance with the methods of this invention, acid soluble materials are contacted and reacted with an aqueous organic acid solution whereby the corrosive effect of the acid solution on metal surfaces also contacted by the acid solution is minimized. The methods are basically comprised of the steps of combining a metal corrosion inhibitor comprising at least one rosin amine derivative and a corrosion inhibitor intensifier selected from the group consisting of thioglycolic acid and its derivatives with an aqueous organic acid solution, and then contacting acid soluble materials and metal surfaces with the acid solution containing the corrosion inhibitor and corrosion inhibitor intensifier.

The methods of this invention can be utilized in a variety of industrial acidizing applications and they are particularly suitable for carrying out acidizing and fracture acidizing procedures in wells to increase the production of hydrocarbons therefrom.

In order to further illustrate the corrosion inhibited organic acid compositions and methods of this invention, the following examples is given.

EXAMPLE 1

Two corrosion inhibitor formulations were prepared comprised of three or more of the product obtained from a Mannich reaction on a rosin amine derivative, isopropylalcohol (IPA), a surfactant comprised of a mixture of C10–C12 aliphatic alcohols ethoxylated with 7 moles of ethylene oxide and the product obtained from a Mannich reaction product involving acetone and formaldehyde. The rosin amine derivative Mannich reaction product was prepared in accordance with a standard preparation procedure whereby two equivalents of formaldehyde were reacted with one equivalent of rosin amine derivative in the presence of two equivalents of hydrochloric acid and excess active ketone. The formulations are set forth in Table I below.

TABLE I

Corrosion Inhibitor Formulations

Formulation Components, % by weight of the Formulation

| Formulation No. | Rosin Amine Derivative Mannich Reaction Product | IPA | Surfactant | Acetone-Formaldehyde Mannich Reaction Product |
|---|---|---|---|---|
| 1 | 60 | 20 | 5 | 15 |
| 2 | 30 | 60 | 2.5 | 7.5 |
| 3 | 30 | 67.5 | 2.5 | — |

Various quantities of the above described corrosion inhibitor formulations and a corrosion inhibitor intensifier of the present invention, i.e., an 80 or 50% by weight aqueous solution of thioglycolic acid, were added to test portions of an aqueous 10% by weight formic acid solution. The resulting corrosion inhibited formic acid test compositions were heated to various temperatures, and preweighed N-80 steel corrosion coupons were immersed in the test compositions for time periods of 16 hours or 24 hours while maintaining the temperatures of the test compositions. At the end of the test periods, the corrosion coupons were removed, rinsed and weighed to determine the amounts of corrosion that took place during the tests. The results of these tests are set forth in Table II below.

TABLE II

Corrosion Inhibited Test Compositions and Test Results

| Test No. | Corrosion Inhibitor Formulation No. | Temperature, °F. | Quantity of Corrosion Inhibitor Formulation Combined With 10% Formic Acid Solution, % by Volume of the Acid Solution | Quantity of Corrosion Inhibitor Intensifier Combined With 10% Formic Acid Solution, % by Volume of the Acid Solution | Corrosion lb/f² hr. 16 Hrs. | 24 Hrs. |
|---|---|---|---|---|---|---|
|   | Blank | 300 | 0 | 0 | — | 0.456 |
| 1 | 1 | 300 | 0.5 | 0.1¹ | 0.007 | — |
| 2 | 1 | 300 | 1.0 | 0.1¹ | 0.007 | — |
| 3 | 1 | 300 | 1.5 | 0.1¹ | 0.008 | — |
| 4 | 1 | 300 | 2.0 | 0.1¹ | 0.013 | — |
| 5 | 1 | 300 | 1.0 | 0.2¹ | 0.010 | — |
| 6 | 1 | 300 | 0.4 | 0.08¹ | 0.009 | — |
| 7 | 1 | 300 | 0.3 | 0.06¹ | 0.008 | — |
| 8 | 1 | 300 | 0.5 | 0 | 0.413 | — |
| 9 | 2 | 300 | 0.5 | 0.1² | — | 0.017 |
| 10 | 3 | 300 | 0.5 | 0.1² | — | 0.009 |
| 11 | 3 | 300 | 0.5 | 0.1² | 0.016 | — |
| 12 | 3 | 300 | 0.5 | 0.1² | — | 0.027 |
| 13 | 3 | 325 | 0.5 | 0.1² | 0.014 | — |

¹80% by weight thioglycolic acid solution.
²50% by weight thioglycolic acid solution.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved metal corrosion inhibited aqueous organic acid composition comprising:

an aqueous organic acid solution;

a corrosion inhibitor comprising at least one rosin amine derivative having the formula

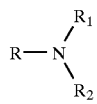

wherein R is selected from the group consisting of abietyl, hydroabietyl and dihydroabietyl radicals, $R_1$ is the radical $CH_2R_3$, $R_2$ is selected from the group consisting of hydrogen and the radical $CH_2R_3$ and $R_3$ is an alpha ketonyl radical; and a corrosion inhibitor intensifier selected from the group consisting of thioglycolic acid, thiolactic acid and thiomalic acid.

2. The composition of claim 1 wherein said alpha ketonyl radical is derived from a ketone selected from the group consisting of acetone, methyl ethyl ketone, diacetone alcohol, 2,4-pentane dionyl, acetonylacetone, isophorone, mesityl oxide, cyclopentanone, cyclohexanone and acetophenone.

3. The composition of claim 1 wherein said corrosion inhibitor further comprises one or more additional components selected from the group consisting of solvents, surfactants and mixtures thereof.

4. The composition of claim 1 wherein said corrosion inhibitor is present in said composition in an amount in the range of from about 0.05% to about 3% by volume of said aqueous organic acid solution in said composition.

5. The composition of claim 1 wherein said corrosion inhibitor intensifier is present in said composition in an amount in the range of from about 0.01% to about 1% by volume of said aqueous organic acid solution in said composition.

6. The composition of claim 1 wherein said organic acid is selected from the group consisting of formic acid, acetic acid, glycolic acid, citric acid and mixtures thereof.

7. The composition of claim 6 wherein said organic acid is present in said composition in an amount in the range of from about 1% to about 30% by weight of said water therein.

8. An improved metal corrosion inhibited aqueous organic acid composition comprising:

an aqueous organic acid solution containing an acid selected from the group consisting of formic acid, acetic acid, glycolic acid, citric acid and mixtures thereof;

a corrosion inhibitor comprised of at least one rosin amine derivative having the formula

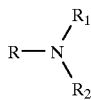

wherein R is selected from the group consisting of abietyl, hydroabietyl and dihydroabietyl radicals, $R_1$ is the radical $CH_2R_3$, $R_2$ is selected from the group consisting of hydrogen and the radical $CH_2R_3$ and $R_3$ is an alpha ketonyl radical, and one or more additional components selected from the group consisting of alkyl alcohol solvents, alkylene glycol solvents and nonionic surfactants; and a corrosion inhibitor intensifier selected from the group consisting of thioglycolic acid, thiolactic acid and thiomalic acid.

9. The composition of claim 8 wherein said alpha ketonyl radical is derived from a ketone selected from the group consisting of acetone, methyl ethyl ketone, diacetone alcohol, 2,4-pentane dionyl, acetonylacetone, isophorone, mesityl oxide, cyclopentanone, cyclohexanone and acetophenone.

10. The composition of claim 9 wherein said corrosion inhibitor is present in said composition in an amount in the range of from about 0.05% to about 3% by volume of said organic acid solution in said composition.

11. The composition of claim 10 wherein said corrosion inhibitor intensifier is present in said composition in an amount in the range of from about 0.01% to about 1% by volume of said organic acid solution in said composition.

12. The composition of claim 11 wherein said organic acid is present in said composition in an amount in the range of from about 1% to about 30% by weight of said water therein.

13. An improved method of contacting and reacting acid soluble materials with an aqueous organic acid solution whereby the corrosive effect of the acid solution on metal also contacted thereby is minimized comprising the steps of:
combining a corrosion inhibitor and a corrosion inhibitor intensifier with said aqueous organic acid solution, said corrosion inhibitor comprising at least one rosin amine derivative having the formula

wherein R is selected from the group consisting of abietyl, hydroabietyl and dihydroabietyl radicals, $R_1$ is the radical $CH_2R_3$, $R_2$ is selected from the group consisting of hydrogen and the radical $CH_2R_3$ and $R_3$ is an alpha ketonyl radical, said corrosion inhibitor intensifier being selected from the group consisting of thioglycolic acid, thiolactic acid and thiomalic acid; and
contacting said acid soluble materials and said metal with said aqueous organic acid solution containing said corrosion inhibitor and said corrosion inhibitor intensifier.

14. The method of claim 13 wherein said alpha ketonyl radical is derived from a ketone selected from the group consisting of acetone, methyl ethyl ketone, diacetone alcohol, 2,4-pentane dionyl, acetonylacetone, isophorone, mesityl oxide, cyclopentanone, cyclohexanone and acetophenone.

15. The method of claim 14 wherein said corrosion inhibitor further comprises one or more additional components selected from the group consisting of solvents and surfactants.

16. The method of claim 15 wherein said corrosion inhibitor is combined with said aqueous organic acid solution in an amount in the range of from about 0.05% to about 3% by volume of said aqueous organic acid solution.

17. The method of claim 16 wherein said corrosion inhibitor intensifier is combined with said aqueous organic acid solution in an amount in the range of from about 0.01% to about 1% by volume of said aqueous organic acid solution.

18. The method of claim 17 wherein said organic acid is selected from the group consisting of formic acid, acetic acid, glycolic acid, citric acid and mixtures thereof.

19. The method of claim 18 wherein said organic acid is present in said aqueous organic acid solution in an amount in the range of from about 1% to about 30% by weight of water therein.

20. A method of acidizing a subterranean formation penetrated by a well bore with an aqueous organic acid solution whereby the corrosive effect of the acid solution on metal contacted thereby is minimized comprising the steps of:
combining a corrosion inhibitor and a corrosion inhibitor intensifier with said aqueous organic acid solution, said corrosion inhibitor comprising at least one rosin amine derivative having the formula

wherein R is selected from the group consisting of abietyl, hydroabietyl and dihydroabietyl radicals, $R_1$ is the radical $CH_2R_3$, $R_2$ is selected from the group consisting of hydrogen and the radical $CH_2R_3$ and $R_3$ is an alpha ketonyl radical, said corrosion inhibitor intensifier being selected from the group consisting of thioglycolic acid, thiolactic acid and thiomalic acid; and
contacting said subterranean formation with said aqueous organic acid solution containing said corrosion inhibitor and said corrosion inhibitor intensifier.

21. The method of claim 20 wherein said alpha ketonyl radical is derived from a ketone selected from the group consisting of acetone, methyl ethyl ketone, diacetone alcohol, 2,4-pentane dionyl, acetonylacetone, isophorone, mesityl oxide, cyclopentanone, cyclohexanone and acetophenone.

22. The method of claim 21 wherein said corrosion inhibitor further comprises one or more additional components selected from the group consisting of solvents and surfactants.

23. The method of claim 22 wherein said corrosion inhibitor is combined with said aqueous organic acid solution in an amount in the range of from about 0.05% to about 3% by volume of said aqueous organic acid solution.

24. The method of claim 23 wherein said corrosion inhibitor intensifier is combined with said aqueous organic acid solution in an amount in the range of from about 0.01% to about 1% by volume of said aqueous organic acid solution.

25. The method of claim 24 wherein said organic acid of said aqueous organic acid solution is selected from the group consisting of formic acid, acetic acid, glycolic acid, citric acid and mixtures thereof.

26. The method of claim 25 wherein said organic acid is present in said aqueous organic acid solution in an amount in the range of from about 1% to about 30% by weight of water therein.

27. The method of claim 20 wherein said corrosion inhibitor is combined with said aqueous organic acid solution in an amount in the range of from about 0.05% to about 3% by volume of said aqueous organic solution.

28. The method of claim 20 wherein said corrosion inhibitor intensifier is combined with said aqueous organic acid solution in an amount in the range of from about 0.01% to about 1% by volume of said aqueous organic acid solution.

29. The method of claim 20 wherein said organic acid of said aqueous organic acid solution is selected from the group consisting of formic acid, acetic acid, glycolic acid, citric acid and mixtures thereof.

30. The method of claim 20 wherein said organic acid is present in said aqueous organic acid solution in an amount in the range of from about 1% to about 30% by weight of water therein.

* * * * *